(12) United States Patent
Kondapi et al.

(10) Patent No.: US 11,604,874 B1
(45) Date of Patent: Mar. 14, 2023

(54) PROVIDING AUDIO VISUAL PRIVACY CONTROLS

(71) Applicant: Dell Products L.P., Round Rock, TX (US)

(72) Inventors: Srikanth Kondapi, Austin, TX (US); Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/483,304

(22) Filed: Sep. 23, 2021

(51) Int. Cl.
*G06F 21/00* (2013.01)
*G06F 21/54* (2013.01)

(52) U.S. Cl.
CPC ........ *G06F 21/54* (2013.01); *G06F 2221/032* (2013.01); *G06F 2221/2125* (2013.01)

(58) Field of Classification Search
None
See application file for complete search history.

(56) References Cited

U.S. PATENT DOCUMENTS

| | | | | |
|---|---|---|---|---|
| 8,468,595 | B1* | 6/2013 | Huang | G06F 21/602 |
| | | | | 726/13 |
| 11,025,892 | B1* | 6/2021 | Aman | H04N 21/458 |
| 2013/0205026 | A1* | 8/2013 | Ricci | G06F 11/2294 |
| | | | | 709/225 |
| 2019/0303562 | A1* | 10/2019 | Masputra | H04L 69/164 |

OTHER PUBLICATIONS

Choupani, Roya et al. Drift-free video coding for privacy protected video scrambling. 2015 10th International Conference on Information, Communications and Signal Processing (ICICS). https://ieeexplore.ieee.org/stamp/stamp.jsp?tp=&arnumber=7459830 (Year: 2015).*

Das, Anupam et al. Assisting Users in a World Full of Cameras: A Privacy-Aware Infrastructure for Computer Vision Applications. 2017 IEEE Conference on Computer Vision and Pattern Recognition Workshops (CVPRW). https://ieeexplore.ieee.org/stamp/stamp.jsp?tp=&arnumber=8014915 (Year: 2017).*

Akkaya, Kemal et al. Privacy-Preserving Control of Video Transmissions for Drone-based Intelligent Transportation Systems. 2019 IEEE Conference on Communications and Network Security (CNS). https://ieeexplore.ieee.org/stamp/stamp.jsp?tp=&arnumber=8802665 (Year: 2019).*

Jang-Jaccard, Julian et al. Security analysis of mobile applications: A case study of a collaboration tool in healthcare. : 9th IEEE International Conference on Collaborative Computing: Networking, Applications and Worksharing, https://ieeexplore.IEEE.org/stamp/stamp.jsp?tp=&arnumber=6680024 (Year: 2013).*

* cited by examiner

*Primary Examiner* — Jeremiah L Avery

(74) *Attorney, Agent, or Firm* — Kirton McConkie; Brian Tucker

(57) ABSTRACT

Audio visual privacy controls can be provided. A privacy service can be configured to interface with multiple filter drivers that are loaded above components of an AV platform to enable the privacy service to selectively block a particular AV app's access to an AV device based on context. A privacy service may leverage a first filter driver to identify an AV app and may leverage a second filter driver to block the AV app's access. The privacy service may consider different types and combinations of context to determine when access to an AV device's stream should be blocked.

20 Claims, 16 Drawing Sheets

Rule Table 300a

| Last Login Time | Network | Location | ECS | Calendar | Events/Info | Action |
|---|---|---|---|---|---|---|
| > 2 mins | Wireless | Home | Present, Open | No upcoming events | Last used by WinHello | Close ECS |
| > 5 mins | Wired | Office | NA | In Meeting | User moving away | Block stream |
| ⋮ | | | | | | |

Rule Table 300b

| App/Event | Action | |
|---|---|---|
| | ECS | No ECS |
| WinHello | Allow Stream | Allow Stream |
| Zoom | Block Stream | Block Stream |
| Teams | Allow Stream | Allow Stream |
| User not present > 2 mins | (1) Close ECS<br>(2) Display static image with "Press F9 to unmute" | (1) Block stream<br>(2) Display static image with "Press F9 to unmute" |
| ⋮ | | |

*FIG. 4A*

Device Info Table 301

| Device ID | Name | Type | Shutter Info |
|---|---|---|---|
| VID_1BFC PID_28C4 | Integrated webcam | Onboard (MIPI) | ECS |
| VID_046D PID_C703 | Logitech webcam | External (USB) | None |
| ... | | | |

App Table 302

| PID | App Type | App Name |
|---|---|---|
| 0x1000 | Native | Zoom |
| 0x2000 | PWA | Teams |
| 0x3000 | Container | Camera |
| ... | | |

App Handle Table 303

| App Name | Handle |
|---|---|
| Zoom | 0xA000 |
| Teams | 0xB000 |
| Camera | 0xC000 |
| ... | |

*FIG. 4B*

Privacy Service 202

| App/Event | Rule Table 300b | |
|---|---|---|
| | Action | |
| | ECS | No ECS |
| WinHello | Allow Stream | Allow Stream |
| Zoom | Block Stream | Block Stream |
| Teams | Allow Stream | Allow Stream |
| User not present > 2 mins | (1) Close ECS<br>(2) Display static image with "Press F9 to unmute" | (1) Block stream<br>(2) Display static image with "Press F9 to unmute" |
| ... | | |

(3) Privacy service 202 uses the PID to determine whether to allow AV app 130 to access AV device 120

PID = 0x2000

| App Table 302 | | |
|---|---|---|
| PID | App Type | App Name |
| 0x1000 | Native | Zoom |
| 0x2000 | PWA | Teams |
| 0x3000 | Container | Camera |
| ... | | |

*FIG. 5B*

Privacy Service 202

Rule Table 300b

| App/Event | Action | |
|---|---|---|
| | ECS | No ECS |
| WinHello | Allow Stream | Allow Stream |
| Zoom | Block Stream | Block Stream |
| Teams | Allow Stream | Allow Stream |
| User not present > 2 mins | (1) Close ECS<br>(2) Display static image with "Press F9 to unmute" | (1) Block stream<br>(2) Display static image with "Press F9 to unmute" |
| ... | | |

(2a) Privacy service 202 detects a context change and determines that a rule should be applied (2b) Privacy service 202 identifies handle by which AV device 120 is being accessed

App Handle Table 303

| App Name | Handle |
|---|---|
| Teams | 0xB000 |
| ... | |

*FIG. 7B*

PROVIDING AUDIO VISUAL PRIVACY CONTROLS

CROSS-REFERENCE TO RELATED APPLICATIONS

N/A

BACKGROUND

Operating systems oftentimes provide an audio video (AV) platform by which AV devices such as webcams, microphones, etc. may be accessed. For example, Windows provides Media Foundation that functions as an intermediary between the application and the AV device.

FIG. 1 provides a Windows-based example of a computing device 100 that includes an AV platform that includes Media Foundation Service 111 (e.g., mfcore.dll hosted by Svchost.exe), an AVStream port driver 112 (e.g., ks.sys and/or portcls.sys) and a streaming server driver 113 (e.g., mskssrv.sys) which enable one or more AV apps 130 to access an AV device 120 via a driver stack 121. AV device 120 could be a webcam, a microphone or any other device that can capture audio and/or video, whether onboard or external to computing device 100. Common examples of AV app(s) 130 include conferencing apps such as Zoom, Teams, WebEx, etc. and authentication/login apps such as Win-Hello. Computing device 100 may also include an embedded controller service 140 that operates at the firmware level to provide an automatic shutter feature for AV device 120. For example, EC service 140 may enable the user to mute (i.e., disable) an onboard webcam by pressing the F9 key or to mute a microphone by pressing the F4 key.

To access AV device 120, AV app 130 can initially interface with streaming server driver 113 to open AV device 120 (e.g., to obtain a handle to AV device) and may then submit requests to Media Foundation Service 111 to receive a stream of the audio and/or video content that AV device 120 captures. Media Foundation Service 111 will in turn submit corresponding requests to driver stack 121. As a result, from the perspective of driver stack 121, the requests will appear as if they originated with the AV platform (e.g., with Svchost.exe) as opposed to AV app 130. Therefore, the AV platform prevents typical access control techniques from being used to implement privacy controls for AV device 120.

Shutters, both manual and hardware-controlled, have been developed to provide AV privacy controls for webcams, particularly on laptops. However, users typically connect external webcams to their laptops which would nullify the benefits of hardware-controlled shutters (e.g., the external webcam may still capture video even when the hardware-controlled shutter is closed). Also, if the external and onboard webcams both have manual shutters, the user would need to remember to close both shutters to ensure privacy. Similar difficulties exist with microphones. As a result of these difficulties, users are oftentimes unaware that their AV devices are active.

BRIEF SUMMARY

The present invention extends to systems, methods and computer program products for providing audio visual (AV) privacy controls. A privacy service can be configured to interface with multiple filter drivers that are loaded above components of an AV platform to enable the privacy service to selectively block a particular AV app's access to an AV device based on context. A privacy service may leverage a first filter driver to identify an AV app and may leverage a second filter driver to block the AV app's access. The privacy service may consider different types and combinations of context to determine when access to an AV device's stream should be blocked.

In some embodiments, the present invention may be implemented as a method for providing privacy controls for one or more AV devices that are available on a computing device. A first filter driver can detect that an AV app is attempting to open a first AV device that is available on the computing device. In conjunction with detecting that the AV app is attempting to open the first AV device, a privacy service can store a first identifier associated with the AV app. While the AV app is reading a stream of the first AV device, the privacy service can detect a context change. In response to detecting the context change, the privacy service can send the first identifier to a second filter driver. The second filter driver can then use the first identifier to prevent the AV app from reading the stream of the first AV device.

In some embodiments, the present invention may be implemented as computer storage media storing computer executable instructions which when executed implement a method for providing privacy controls for one or more AV devices that are available on a computing device. In response to an AV app opening a first AV device that is available on the computing device, a privacy service may receive, from a first filter driver, a handle by which the AV app opened the first AV device. The privacy service may then store the handle. The privacy service may then determine that a stream of the first AV device should be blocked. The privacy service can send a notification to a second filter driver to block the stream of the first AV device. The notification can include the handle. The second filter driver can then use the handle to prevent the AV app from reading the stream of the first AV device.

In some embodiments, the present invention may be implemented as a computing device having one or more processors and computer storage media storing computer executable instructions which when executed by the one or more processors implement a method for providing privacy controls for one or more AV devices that are available on the computing device. A first filter driver can be loaded to detect when AV apps attempt to open AV devices that are available on the computing device. A second filter driver can be loaded to detect when the AV apps generate requests to read streams that the AV devices provide. A privacy service can be loaded to interface with the first filter driver and the second filter driver. The privacy service can be configured to instruct the second filter driver to prevent the AV apps from reading the streams of the AV devices based on context.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A and 4B provide examples of data structures that could be employed in one or more embodiments of the present invention;

FIGS. 5A-5D provide an example of how privacy controls may be provided for an AV device in one or more embodiments of the present invention;

FIGS. 7A-7D provide another example of how privacy controls may be provided for an AV device in one or more embodiments of the present invention.

DETAILED DESCRIPTION

Although the description employs Windows-based examples and terminology, embodiments of the present invention should not be construed as being limited to implementation on Windows-based systems. To the contrary, other operating systems (e.g., Android and Linux) include components that are functionally similar or equivalent to the Windows-based components described herein. Therefore, the techniques described herein, by which embodiments of the present invention provide AV privacy controls, can be implemented in any operating system environment that provides an AV platform.

Figure 2:
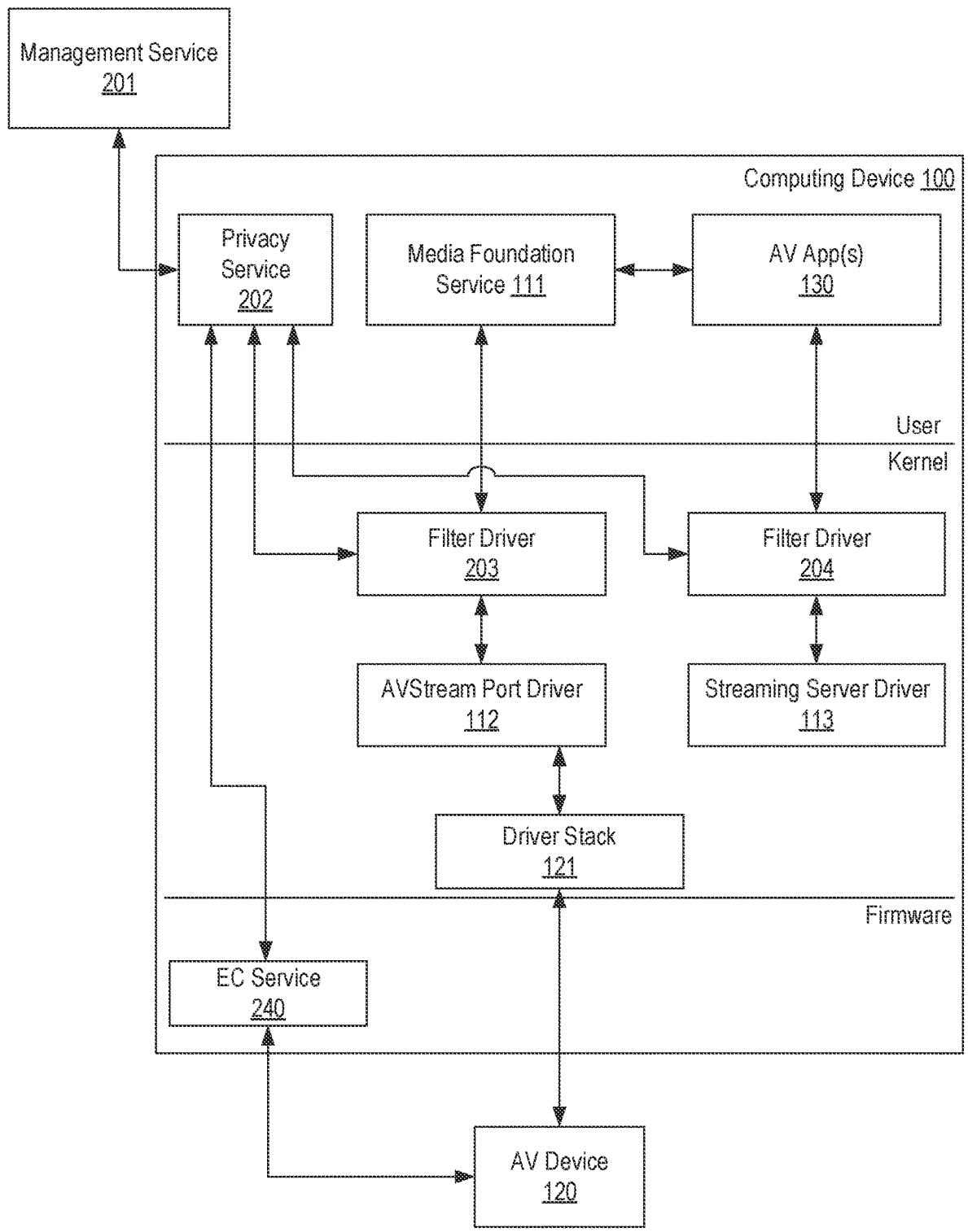
FIG. 2 provides an example of various components that may be employed on the computing device of FIG. 1 to provide AV privacy controls in accordance with one or more embodiments of the present invention.

FIG. 2 provides an example of components that may be employed on computing device 100 to provide privacy controls for AV device 120 in accordance with one or more embodiments of the present invention. In this example, it will be assumed that AV device 120 is a webcam, but the described techniques can be implemented when AV device 120 is a microphone or any other device that provides an audio and/or video stream.

Figure 1:
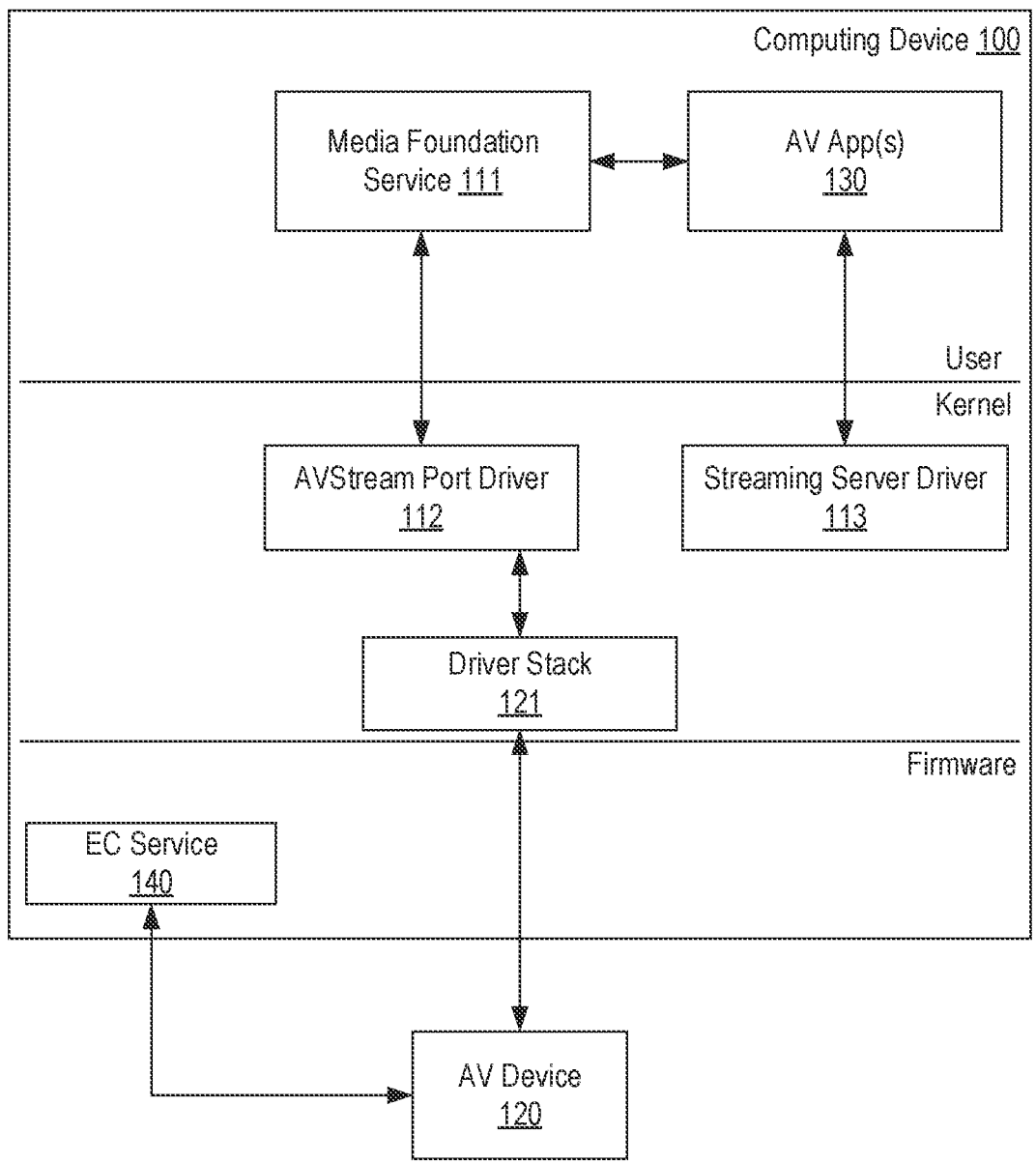
FIG. 1 provides an example of a computing device that includes an AV platform by which AV apps may access AV devices.

Relative to FIG. 1, FIG. 2 adds a management service 201 which may be external to computing device 100 (e.g., in the cloud or a network location), a privacy service 202 which may be a user-mode component in some embodiments, a filter driver 203 which may be positioned above AVStream port driver 112 and a filter driver 204 which may be positioned above streaming server driver 113. In Windows-based implementations, filter drivers 203 and 204 could be Windows driver platform upper filter drivers, including separate instances of the same driver, but could be implemented using any suitable technique. Therefore, filter drivers 203 and 204 should be construed in accordance with the functionality they perform. Also, an EC service 240 may run at the firmware level and may provide similar functionality as EC service 140 (e.g., an automatic shutter feature) with the additional functionality described herein. EC service 240 need not be included on each computing device 100 such as when computing device 100 does not provide automatic shutter functionality.

As an overview, privacy service 202 may interface with filter drivers 203 and 204 to enable privacy controls to be implemented based on context. Privacy service 202 may obtain rules for implementing these context-based privacy controls from management service 201. Alternatively or additionally, privacy service 202 may leverage machine learning techniques to develop such rules (e.g., directly or via a separate machine learning agent on computing device 100 either of which may interface with an external machine learning service).

Figure 3A:
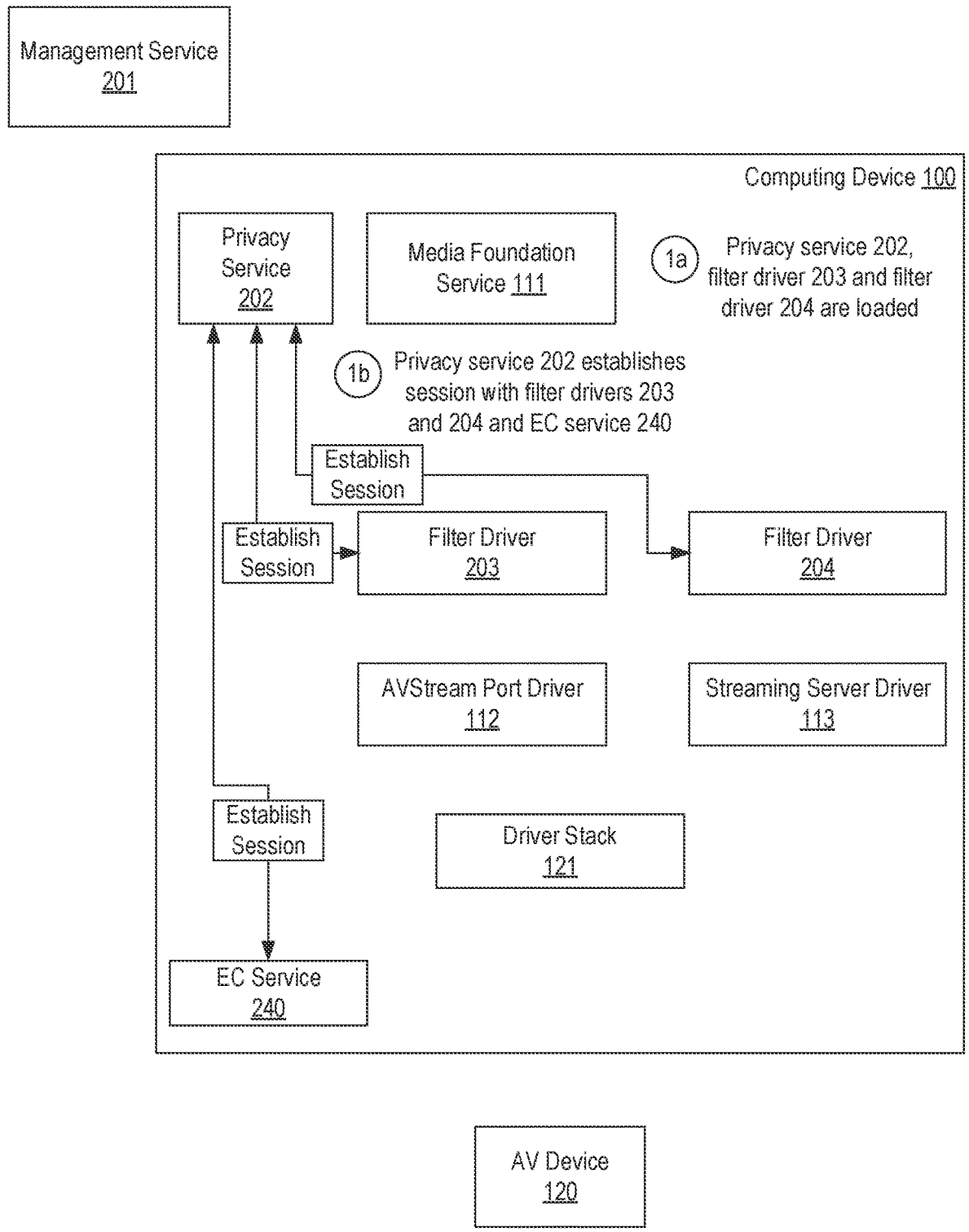
FIGS. 3A and 3B provide an example of initialization functionality that may be performed in one or more embodiments of the present invention.
Figure 3B:
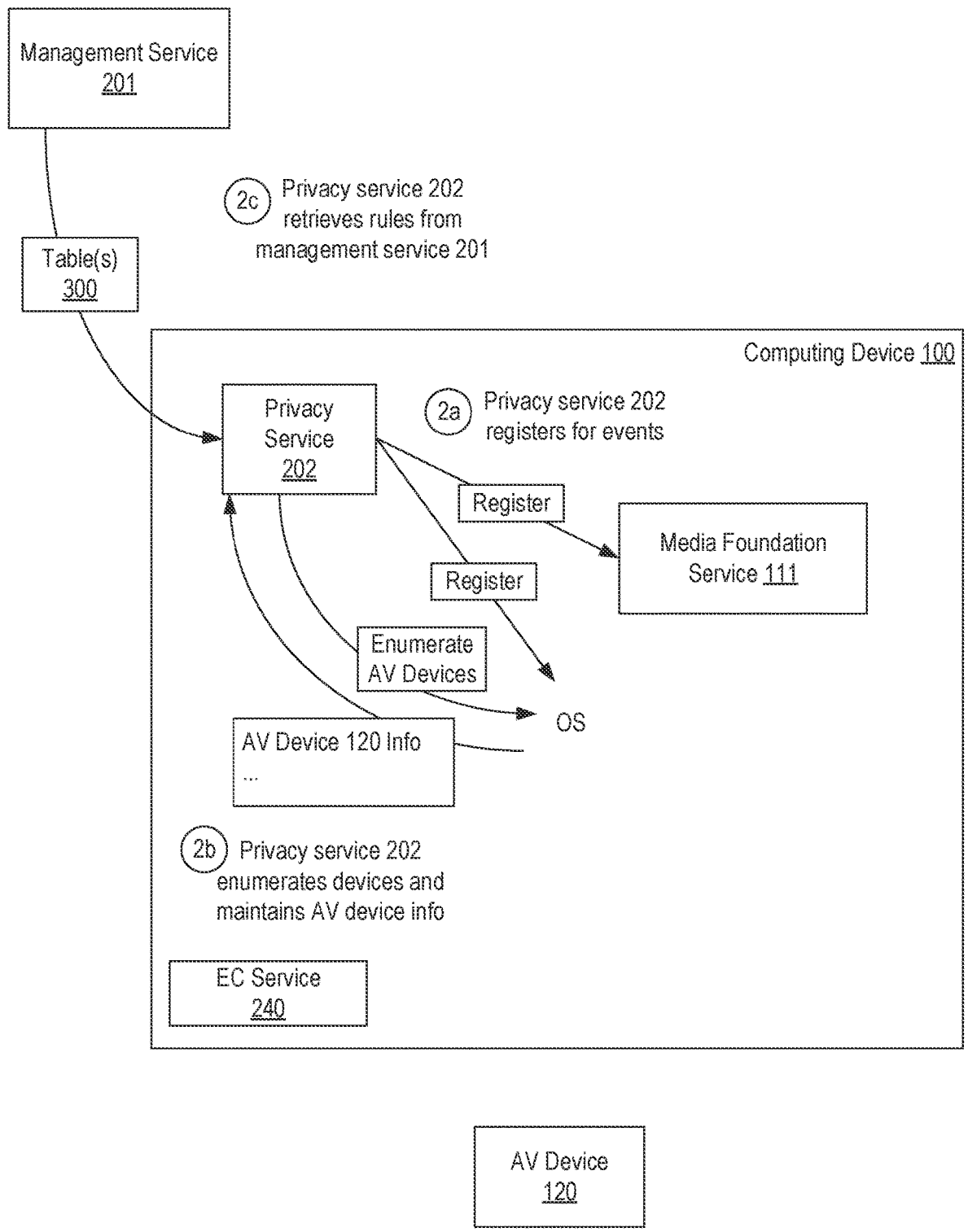

FIGS. 3A and 3B provide an example, in the context of FIG. 2, of initial functionality that may be performed in one or more embodiments of the present invention to enable privacy controls to be provided for one or more AV devices that may be integrated into or connected to computing device 100 such as AV device 120. In some embodiments, the depicted functionality could be performed as part of startup on computing device 100.

Turning to FIG. 3A, in step 1a, it is assumed that privacy service 202, filter driver 203 and filter driver 204 are loaded on computing device 100. As stated above, filter driver 203 could be loaded as an upper filter driver for AVStream port driver 112 and filter driver 204 could be loaded as an upper filter driver for streaming server driver 113. In step 1b, privacy service 202 can establish a session with filter driver 203, filter driver 204 and EC service 240 (assuming EC service 240 is present on computing device 100). For example, privacy service 202 may establish a session for communicating with filter drivers 203 and 204 via IOCTLs while privacy service 202 may establish a session for communicating with EC service 240 via the ACPI. Privacy service 202 can subsequently employ such sessions to communicate with the respective components to perform the functionality described below.

Turning to FIG. 3B, in step 2a, privacy service 202 can register for events with various components such as the operating system and media foundation service 111. These events could include device connection events (e.g., to be notified if the user connects an external AV device), application load events (e.g., to be notified when an AV app is loaded), meeting/calendar events (e.g., to be notified when a meeting has started or is about to start), network events (e.g., to be notified when computing device 100 is connected to or disconnected from a network), user proximity events (e.g., to detect whether the user is present in front of computing device 100), login events, etc. In short, step 2a can encompass any action that privacy service 202 may perform to be able to gather context for determining which actions to perform to implement privacy controls.

In step 2b, privacy service 202 may enumerate devices to identify and obtain information about AV devices that are available on computing device 100. In this example, step 2b will yield information about AV device 120 and possibly other AV devices that may be integrated into or connected to computing device 100. As described further below, privacy service 202 may maintain the information about AV device 120 for subsequent use.

In step 2c, privacy service 202 can interface with management service 201 to retrieve and cache rules for providing privacy controls on computing device 100. In some embodiments, privacy service 202 could retrieve such rules every time it is loaded, whereas in other embodiments, it may periodically (e.g., weekly) retrieve and store such rules. These rules could be defined in the form of one or more tables 300 or any other suitable format. As one possible example, an administrator of an organization could define rules that are applicable to some or all computing devices 100 that employees of the organization use.

FIGS. 4A and 4B provide examples of various information that privacy service 202 may maintain as part of providing privacy controls in accordance with one or more embodiments of the present invention. FIG. 4A includes rule table 300a and rule table 300b which are simple examples of how rules may be defined. Privacy service 202 could retrieve either or both of tables 300a and 300b in step 2c of FIG. 3B.

Rule table 300a is an example where the rules define actions that privacy service 202 should take based on combinations of contextual information. As an example only, rule table 300a defines actions based on context of a last login time, a network that computing device 100 is connected to, a location of computing device 100, the presence and state of an automatic shutter (e.g., an embedded controller controlled shutter or ECS), calendar information and other events or information. A rule table could rely on any suitable number and/or combination of contextual information to define when a particular action should be performed.

In the depicted example, rule table 300a includes a rule that dictates that privacy service 202 should close the ECS of an AV device if the last login time was more than 2 minutes ago, the computing device is connected to a wireless network at the user's home, the AV device includes an ECS which is open, the user is not in a meeting and has no upcoming meetings within a specified amount of time (e.g., within the next 10 minutes) and WinHello was the last app to use the AV device. This rule could therefore represent a scenario where the user opened the ECS of AV device 120 to log in to computing device 100 but then forgot to close the ECS.

Rule table 300a also includes a rule that dictates that privacy service 202 should block the audio and/or video stream from an AV device if the last login time was more than 5 minutes ago, the computing device is connected to a wired network in the office, the AV device does not include an ECS and the user is participating in a meeting but is moving away from the computing device (e.g., based on information obtained from a proximity sensor). This rule could therefore represent a scenario where the user is temporarily stepping away from a meeting and may have unknowingly forgotten to turn off the webcam or microphone. As can be seen, a wide variety of rules could be configured to address a wide variety of scenarios where it may be preferable to mute an AV device.

Rule table 300b is a simpler example where the rules define actions to take based on a single context. Rule table 300b includes rules specific to the WinHello, Zoom and Teams apps and a rule specific to an event where the user is not present at the computing device for more than 2 minutes. Rule table 300b also shows that different actions could be defined based on whether the AV device includes an ECS. For example, when the user is not present for more than 2 minutes and the AV device includes an ECS, the actions may include closing the ECS and providing a static image to an AV app that includes the instruction to "press F9 to unmute" the AV device. In contrast, when the user is not present for more than 2 minutes and the AV device does not include an ECS, the actions may include blocking the stream from the AV device and replacing the stream with the same static image.

FIG. 4B provides examples of tables that privacy service 202 may create based on the AV devices and AV apps that are present on computing device 100. For example, privacy service 202 may create device info table 301 as part of step 2b of FIG. 3B and may update device info table 301 whenever an AV device is connected to or disconnected from computing device 100. Device info table 301 can define information about each AV device such as the device ID (e.g., a vendor ID (VID) and product ID (PID)), a name, a type (e.g., whether onboard or external and possibly the interface type), shutter information (e.g., whether it has an ECS), etc. In some embodiments, privacy service 202 could use the information defined in device info table 301 as part of determining whether a particular rule should be applied (i.e., the device info can be context that privacy service 202 considers).

Privacy service 202 may create an app table 302 and an app handle table 303 that define information about AV apps 130. App table 302 may map a process ID (PID) of each AV app 130 to its app type (e.g., native, PWA, containerized, UWP, Electron, etc.) and app name (e.g., Zoom, Teams, Camera, etc.). Notably, the PID could be for a browser, container, etc. when AV app 130 is hosted in a browser, container, etc. Accordingly, embodiments of the present invention may be used to provide privacy controls regardless of how an AV app is hosted.

Privacy service 202 may create and update app table 302 as part of being notified of the events it registered for in step 2a of FIG. 3B. For example, privacy service 202 could be notified when AV app 130 is loaded and can obtain its process ID and other information for populating an entry in app table 302. In some embodiments, privacy service 202 could use the information defined in app table 302 to identify a particular AV device (e.g., to obtain its name from its process ID) and/or as context for determining whether a rule applies (e.g., when a rule considers the type of the app as context).

Privacy service 202 may create and update app handle table 303 as part of allowing an AV app 130 to access an AV device. For example, app handle table 303 may map an app's name to the app's handle to AV device 120. As described below, privacy service 202 may use the information defined in app handle table 303 as part of determining which rules may be applicable to a particular AV app's attempt to read an AV device's audio and/or video stream.

FIGS. 5A-5D provide an example of how privacy service 202 and filter driver 204 may interoperate when an AV app 130 attempts to open an AV device 120 on computing device 100. In this example, it is assumed that AV app 130 has already been loaded and that privacy service 202 has obtained table 300b from management service 201 and populated table 301 with information about AV device 120 and possibly other AV devices.

Figure 5A:
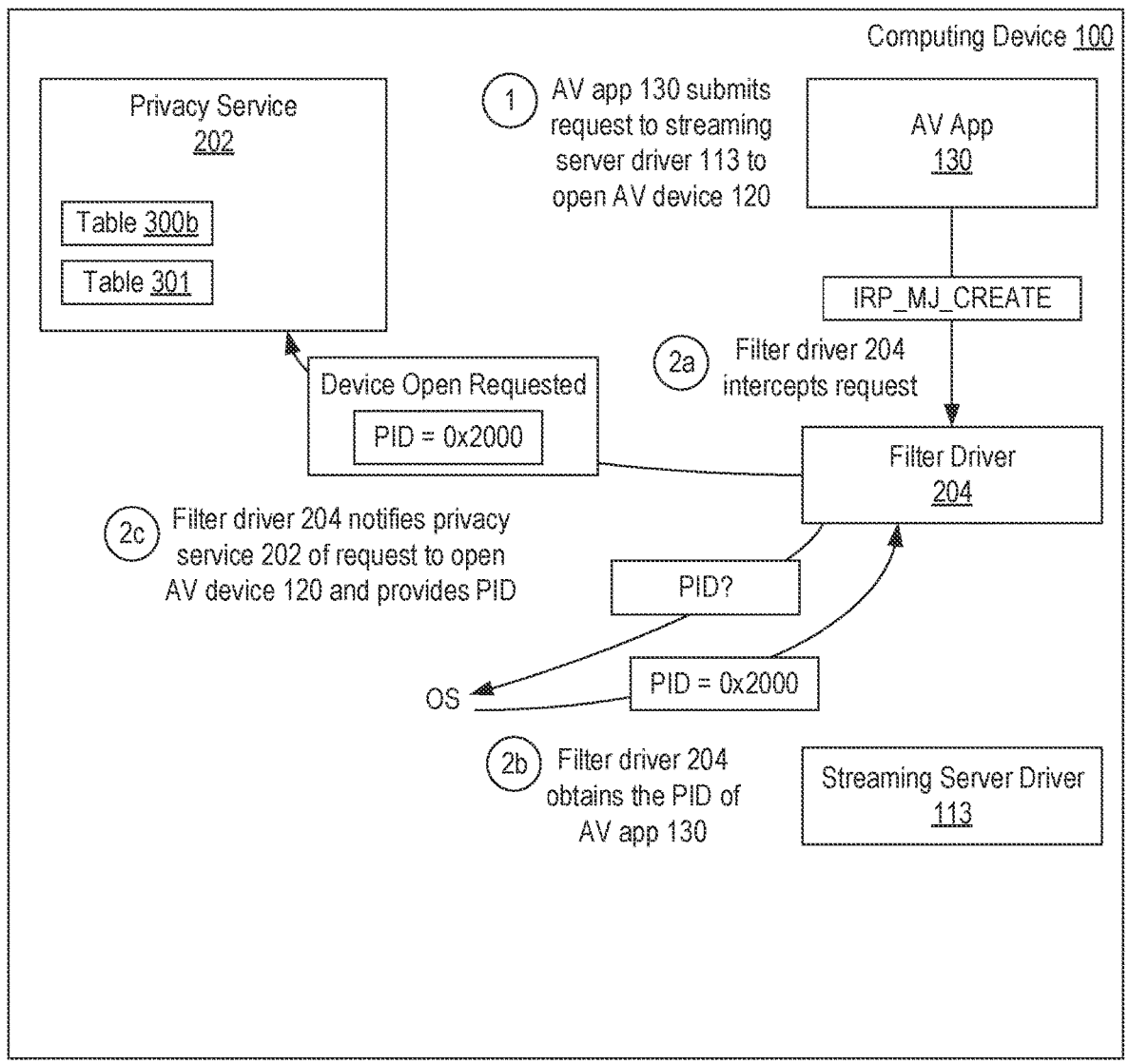

Turning to FIG. 5A, in step 1, AV app 130 submits a request to streaming server driver 113 to open AV device 120. As one example only, AV app 130 could call a method of the Frame Server Client interface (fsclient.dll) that causes an IRP_MJ_CREATE IOCTL to be sent towards streaming server driver 113. In step 2a because filter driver 204 is layered on top of streaming server driver 113, it will intercept AV app 130's request to open AV device 120 and will therefore be able to process the request before it is delivered to streaming service driver 113. In step 2b, filter driver 204 can obtain the process ID of AV app 130 such as by calling the IoGetRequestorProcessId function. In this example, it is assumed that AV app 130 is Teams and that its process ID is 0x2000. In step 2c, filter driver 204 can notify privacy service 202 of AV app 130's request to open AV device 120 and can provide the PID in this notification.

Turning to FIG. 5B, in step 3 and in response to the notification that AV app 130 is attempting to open AV device 120, privacy service 202 can use the process ID to determine whether to allow AV app 130 to access AV device 120. For example, privacy service 202 can use the PID supplied in the notification to determine from app table 302 that AV app 130 is Teams and may then determine from rule table 300b that Teams should be allowed to access AV devices including AV device 120. In comparison, if Zoom attempted to open AV device 120, privacy service 202 would determine from rule table 300b that access should be blocked. Of course, privacy service 202 could use rule table 300a or any other rule table or data structure in this step to determine whether to allow any particular AV app to access any particular AV device.

Figure 5C:
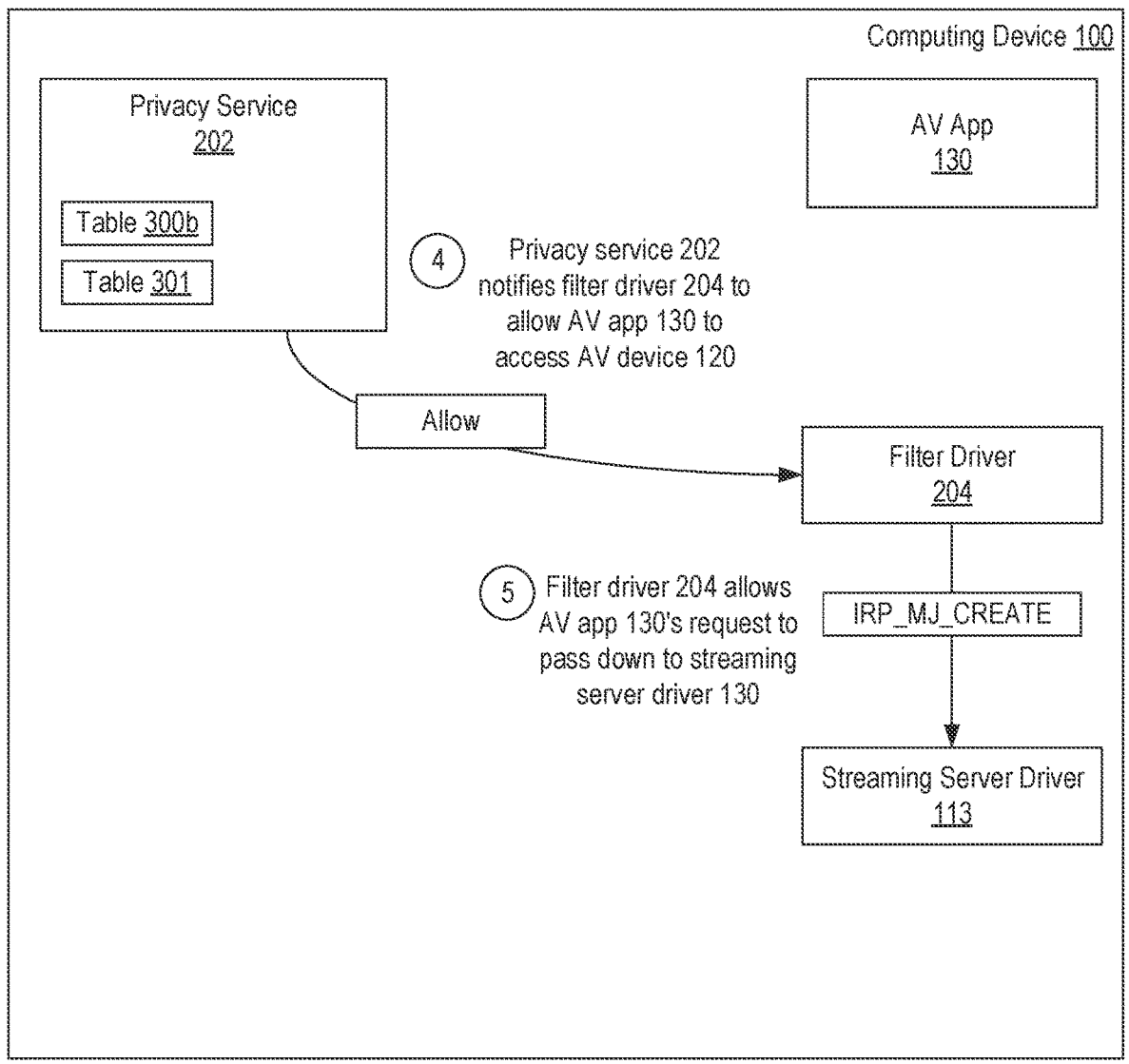

Turning to FIG. 5C, in step 4, privacy service 202 can notify filter driver 204 that AV app 130 should be allowed to access AV device 120. Then, in step 5, filter driver 204 can allow AV app 130's request to pass down to streaming server driver 113. In contrast, if privacy service 202 had determined that access should not be allowed, such as if Zoom were attempting to open AV device 120, it could notify filter driver 204 accordingly which could in turn complete the request with STATUS_ACCESS_DENIED or other suitable status.

Figure 5D:
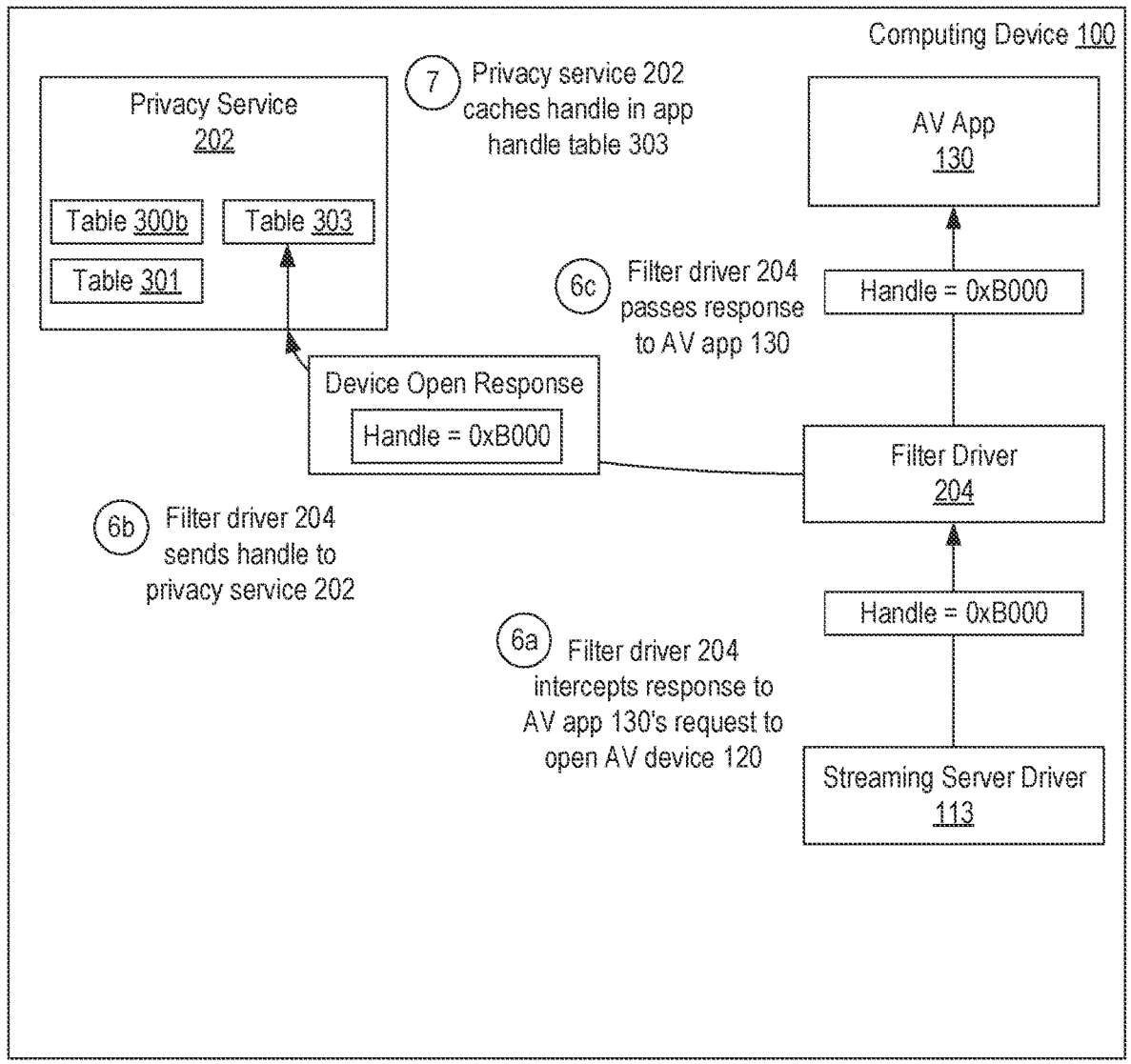

Turning to FIG. 5D, it is assumed that streaming server driver 113 has completed its handling of the request and has therefore returned a handle of 0xB000. In step 6a, filter driver 204 receives this response as it is passed towards AV app 130. In step 6b and as part of its handling of the response, filter driver 204 can identify the handle and send it to privacy service 202, and in step 6c, filter driver 204 can pass the response up to AV app 130. In step 7, privacy service 202 can cache the handle in app handle table 303. Accordingly, at this point, AV app 130 has a handle that it can use to access AV device 120 (e.g., to commence reading an audio and/or video stream that AV device 120 provides) and privacy service 202 knows what this handle is.

Figure 6:
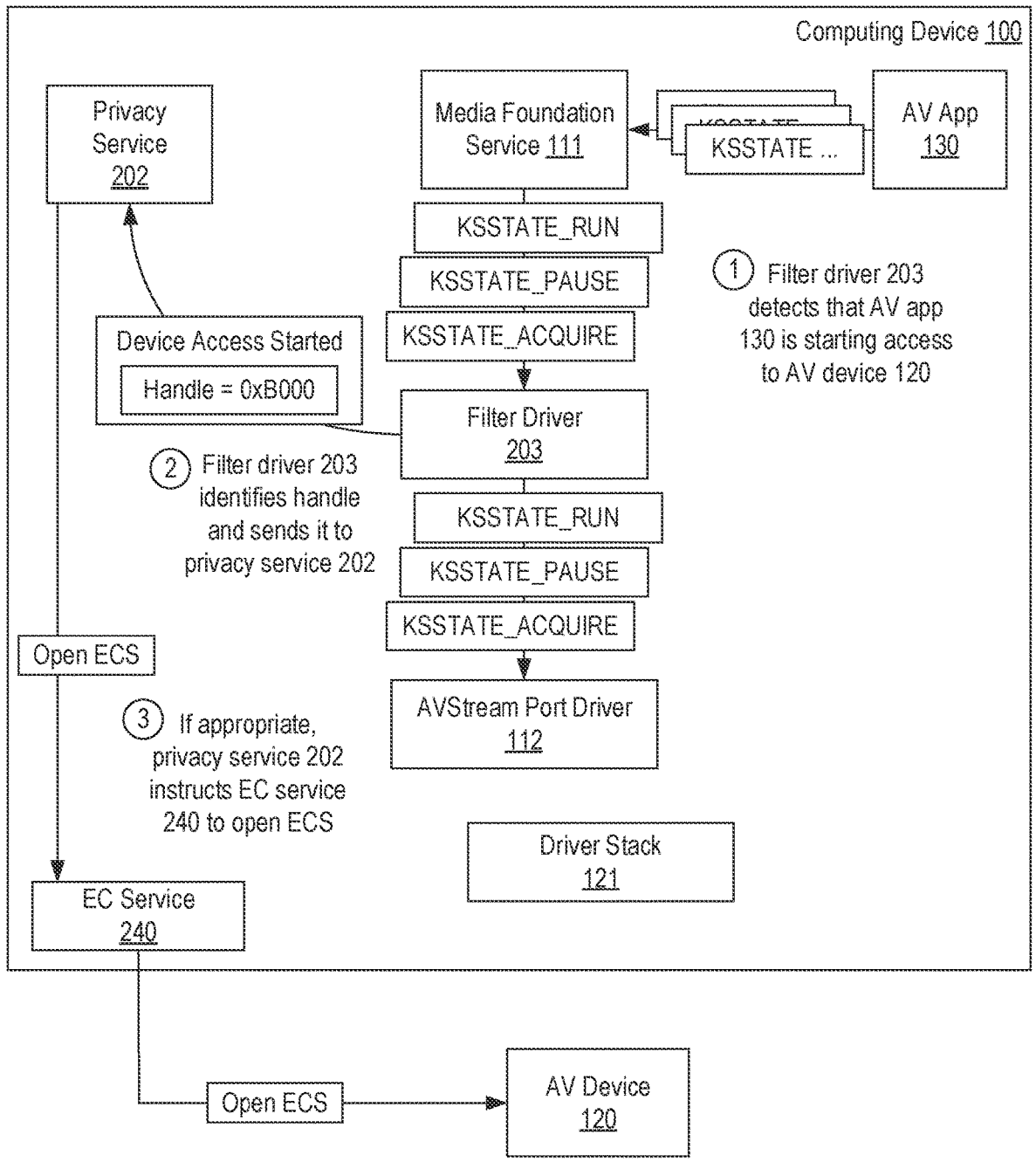
FIG. 6 provides another example of how privacy controls may be provided for an AV device in one or more embodiments of the present invention.

FIG. 6 provides an example of functionality that privacy service 202 and filter driver 203 may perform in some embodiments when AV app 130 starts accessing AV device 120. In step 1, filter driver 203 can detect that AV app 130 is starting to access AV device 120. For example, in a Windows-based implementation, AV app 130 may cause a sequence of streaming state commands to occur such as KSSTATE_ACQUIRE, KSSTATE_PAUSE and KSSTATE_RUN. Filter driver 203 can detect when this sequence occurs. In step 2 and in response to detecting that AV app 130 has started accessing AV device 120, filter driver 203 can identify the handle by which AV app 130 is accessing AV device 120, which in this example will be 0xB000, and send it to privacy service 202 as part of a notification that access to AV device 120 has started. Then, in step 3 and if appropriate, privacy service 202 may instruct EC service 240 to open the ECS of AV device 120. As an example, opening the ECS may be appropriate if the AV device being accessed has an ECS, the ECS is closed and no rules dictate that the ECS should remain closed. Accordingly, the ECS may be opened based on context. In some embodiments, privacy service 202 may be configured to always open the ECS when WinHello or another login app is attempting to access a webcam.

By implementing the functionality represented in FIG. 6, embodiments of the present invention may automatically and intelligently open the ECS of an AV device when an AV app starts accessing it. Alternatively, in some embodiments, privacy service 202 may not instruct EC service 240 to open the ECS but may instead instruct filter driver 203 to replace the stream from AV device 120 with a screen that instructs the user to manually open the ECS (e.g., to press the F9 key) using a similar technique as described below.

Figure 7A:
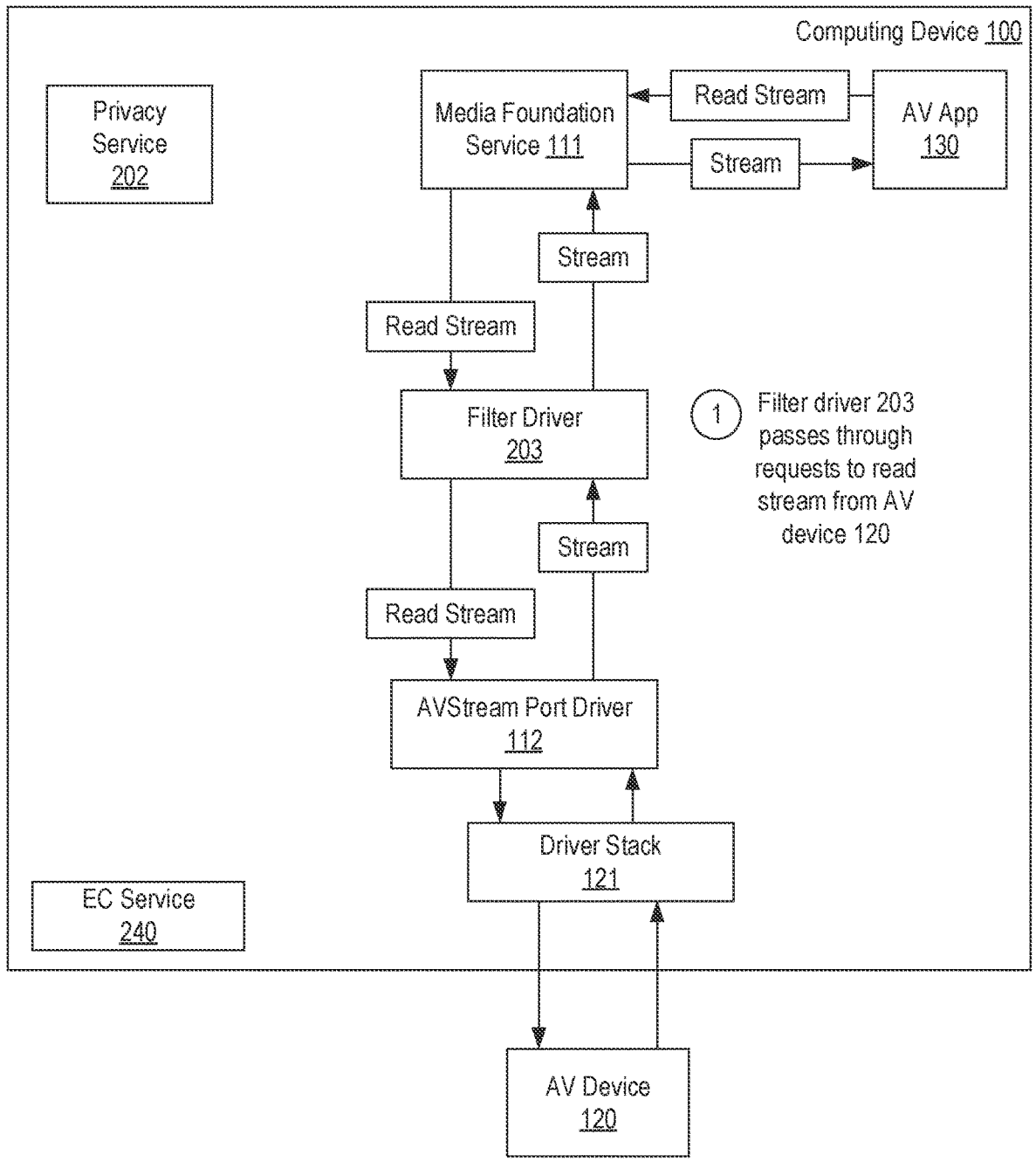

FIGS. 7A-7D provide an example of how privacy controls can be implemented based on context while AV app 130 is accessing AV device 120 in one or more embodiments of the present invention. In FIG. 7A, it is assumed that AV app 130 is reading the stream that AV device 120 provides. For example, AV app 130 could call the ReadSample method in a Windows-based implementation. It is also assumed that filter driver 203 is currently configured to allow AV app 130 to access AV device 120 which may be the case after the process of FIGS. 5A-5D is performed or if privacy service 202 has not instructed filter driver 203 to block AV app 130 from accessing AV device 120. Accordingly, in step 1, filter driver 203 passes through AV app 130's requests to read the stream from AV device 120, which may be in the form of IOCTL_KS_READ_STREAM requests when received at filter driver 203.

Turning to FIG. 7B, privacy service 202 can be configured to obtain relevant context while AV devices, including AV device 120, are being accessed. For example, as a result of the functionality represented in FIG. 3B, privacy service 202 can receive notifications of events that provide context to enable privacy service 202 to determine if any rule, such as those defined in rule table 300a or rule table 300b, should be applied.

As part of monitoring for and obtaining relevant context while AV app 130 accesses AV device 120, in step 2a, it is assumed that privacy service 202 detects a context change and determines that a rule should be applied. For example, based on notifications received from a proximity sensor, privacy service 202 could determine that the user has not been present in front of computing device 100 for more than 2 minutes and therefore the corresponding rule in rule table 300b should be applied. Although not shown, privacy service 202 could access device info table 301 as part of step 2a to determine whether AV device 120 includes an ECS to thereby be able to select the appropriate actions for this rule. Assuming that AV device 120 includes an ECS, the rule dictates that the ECS should be closed and that a static image with the textual instruction "press F9 to unmute" should be provided to AV app 130 in place of the stream from AV device 120. As mentioned above, in some embodiments, privacy service 202 could leverage machine learning to determine when an action should be performed.

In step 2b, privacy service 202 may access app handle table 303 to obtain the handle by which AV app 130 is accessing AV device 120, which in this case is 0xB000. Notably, in some instances, app handle table 303 could associate more than one handle with AV app 130. For example, if Teams were using a webcam and a separate microphone, the process depicted in FIGS. 5A-5D could have been performed for both the webcam and the microphone such that there would be two entries in app handle table 303, one mapping the handle to the webcam to Teams and another mapping the handle to the microphone to Teams. Therefore, step 2b in FIG. 7B can encompass identifying one or more handles by which AV app 130 is accessing corresponding one or more AV devices. Also, different sets of actions could be applicable to the different AV devices in such scenarios.

Figure 7C:
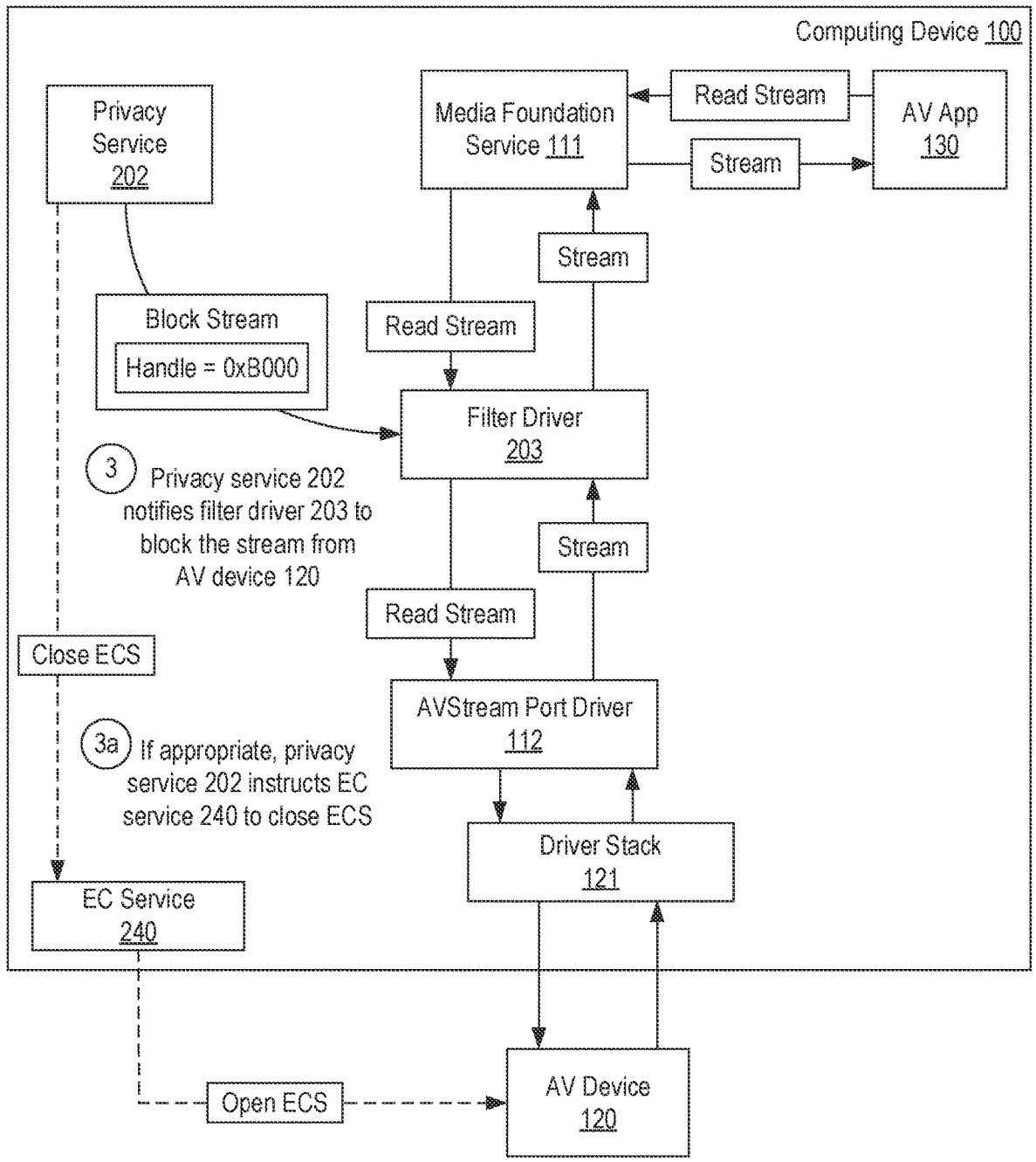

Turning to FIG. 7C, in step 3, privacy service 202 can notify filter driver 203 to block the stream from AV device 120 (or to perform any other action that an applicable rule may define). This notification can include the handle so that filter driver 203 can know which stream it should block. Again, if AV app 130 were accessing multiple AV devices, step 3 could include sending the handle for each of the AV devices and may define appropriate action(s) that filter driver 203 should take for each of the AV devices. In the present example, this notification to block the stream from AV device 120 can include an indication that filter driver 203 should present a static image with the textual instruction as part of blocking the stream (or possibly the static image itself could be included in the notification).

In step 3a, which may be an optional step, privacy service 202 may instruct EC service 240 to close the ECS of AV device 120. This step is optional because not all AV devices have an ECS, and even when an AV device includes an ECS, privacy service 202 need not close it as part of causing filter driver 203 to block an AV app from reading its stream.

Figure 7D:
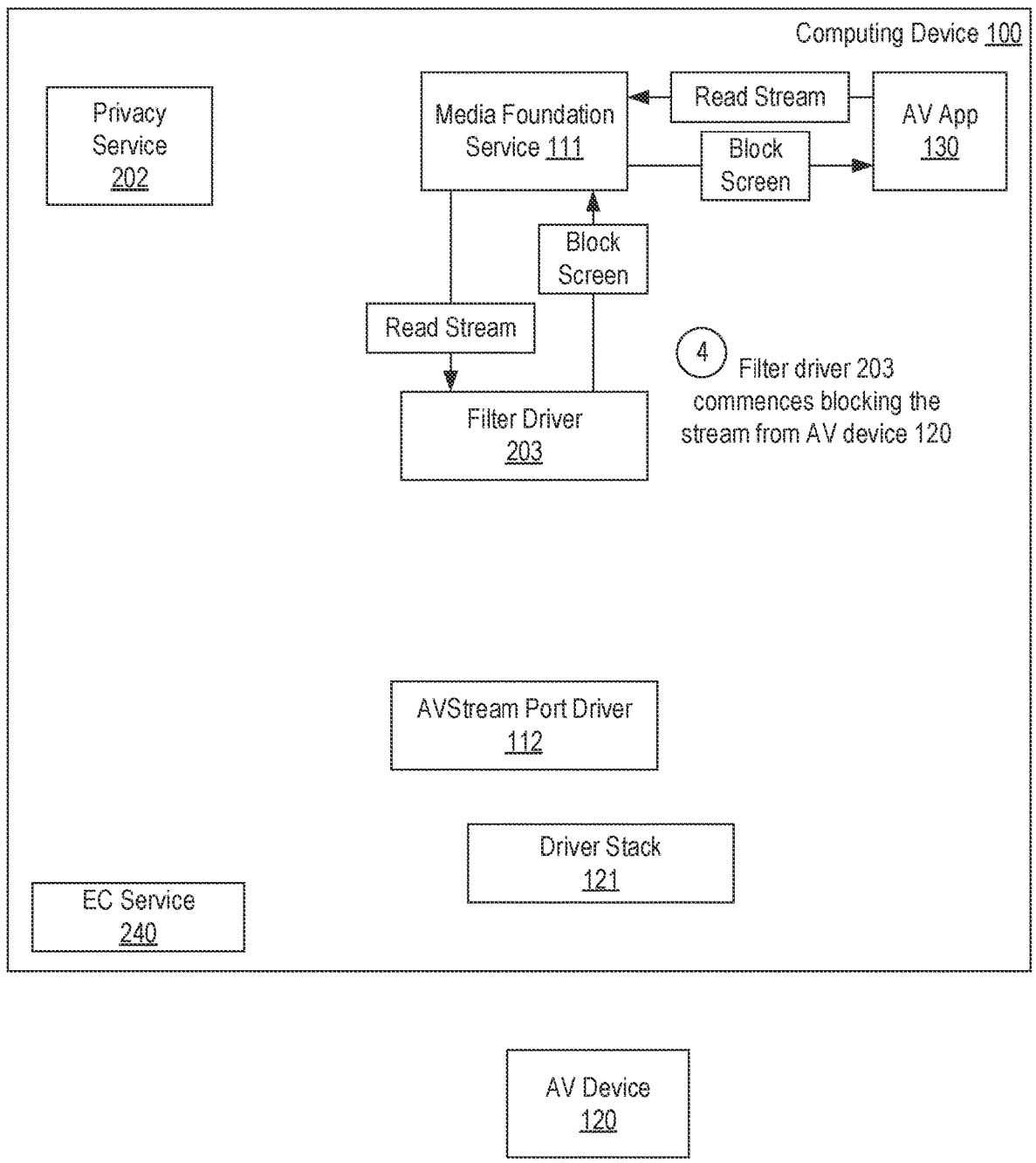

Turning to FIG. 7D, in step 4, filter driver 203 can commence blocking the stream from AV device 120 to thereby prevent AV app 130 from receiving the stream. For example, upon receiving a request to read a stream that is associated with the handle 0xB000, filter driver 203 can complete the request directly by filling a buffer with the static image having the textual instruction rather than passing the request through to allow the buffer to be filled with the captured audio and/or video content. As a result of step 4, AV app 130 will continue receiving a stream but the stream will include the static image. In other words, AV app 130 can continue functioning in its intended manner (e.g., to include computing device 100 in an ongoing meeting) but privacy service 202 and filter driver 203 will ensure that any audio and/or video content that AV device 120 captures or could capture is made available to AV app 130 (e.g., to prevent the user or his or her environment from being captured while the user has stepped away from computing device 100 or whenever any other context is detected).

After blocking the stream of AV device 120, privacy service 202 could detect another context change and determine that a rule indicates that the stream should again be allowed. For example, in response to the user pressing the F9 key or possibly in response to detecting the user's presence, privacy service 202 could notify filter driver 203 to return to passing through AV app 130's requests to read the stream from AV device 120.

Figure 8:
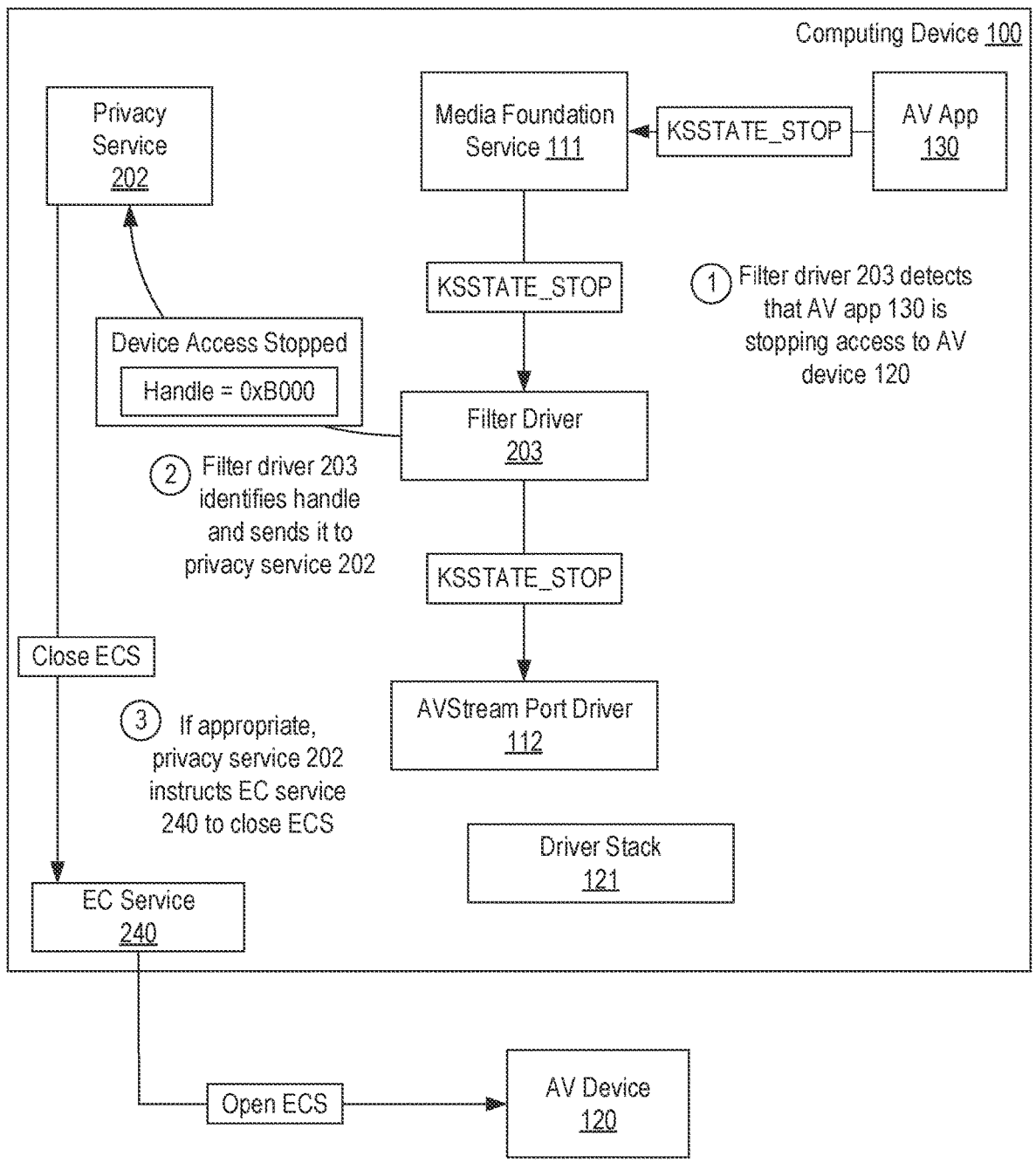
FIG. 8 provides another example of how privacy controls may be provided for an AV device in one or more embodiments of the present invention.

FIG. 8 is similar to FIG. 6 but provides an example of functionality that privacy service 202 and filter driver 203 may perform in some embodiments when AV app 130 stops accessing AV device 120. In step 1, filter driver 203 can detect that AV app 130 has stopped accessing AV device 120. For example, in a Windows-based implementation, AV app 130 may send the KSSTATE_STOP state command (e.g., when a meeting is terminated or the user turns off his or her camera within AV app 130), and filter driver 203 can detect this state command. In step 2 and in response to detecting that AV app 130 has stopped accessing AV device 120, filter driver 203 can identify the handle by which AV app 130 was accessing AV device 120, which in this example is 0xB000, and send it to privacy service 202 as part of a notification that access to AV device 120 has stopped. Then, in step 3 and if appropriate, privacy service 202 may instruct EC service 240 to close the ECS of AV device 120. As an example, closing the ECS may be appropriate if the AV device being accessed has an ECS, the ECS is open and no rules dictate that the ECS should remain open. By implementing the functionality represented in FIG. 8, embodiments of the present invention may automatically and intelligently close the ECS of an AV device when an AV app stops accessing it. Notably, the steps in FIG. 6 and in FIG. 8 could be repeated as appropriate while AV app 130 runs. For example, AV app 130 could repeatedly start and stop its access to AV device 120 such as when the user repeatedly turns on and off his or her camera during a meeting.

In summary, embodiments of the present invention can provide privacy controls for AV devices based on context. These privacy controls can be provided in a uniform manner regardless of how an AV app is hosted and for a variety of AV devices.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing privacy controls for one or more audio visual (AV) devices that are available on a computing device, the method comprising:

detecting, at a first filter driver, that an AV app is attempting to open a first AV device that is available on the computing device;

in conjunction with detecting that the AV app is attempting to open the first AV device, storing, by a privacy service, a first identifier associated with the AV app;

while the AV app is reading a stream of the first AV device, detecting, by the privacy service, a context change;

in response to detecting the context change, sending, by the privacy service, the first identifier to a second filter driver; and using, by the second filter driver, the first identifier to prevent the AV app from reading the stream of the first AV device.

2. The method of claim 1, wherein the first filter driver is layered on a streaming server driver and the second filter driver is layered on an AVStream port driver.

3. The method of claim 1, wherein the first filter driver and the second filter driver are separate instances of a same filter driver.

4. The method of claim 1, wherein the first filter driver provides the first identifier to the privacy service.

5. The method of claim 4, wherein the first identifier is a handle to the first AV device.

6. The method of claim 1, wherein the second filter driver uses the first identifier to prevent the AV app from reading the stream of the first AV device by filling a buffer of a read request that is associated with the first identifier.

7. The method of claim 6, wherein the second filter driver fills the buffer with a static image.

8. The method of claim 7, wherein the static image includes a textual instruction.

9. The method of claim 1, further comprising:

detecting, by the second filter driver, that the AV app is starting to read the stream of the first AV device;

in conjunction with detecting that the AV app is starting to read the stream of the first AV device, sending, by the second filter driver, the first identifier to the privacy service; and in response to receiving the first identifier from the second filter driver, causing, by the privacy service, a shutter of the first AV device to be opened.

10. The method of claim 1, further comprising:

detecting, by the second filter driver, that the AV app is ceasing to read the stream of the first AV device;

in conjunction with detecting that the AV app is ceasing to read the stream of the first AV device, sending, by the second filter driver, the first identifier to the privacy service; and in response to receiving the first identifier from the second filter driver, causing, by the privacy service, a shutter of the first AV device to be closed.

11. The method of claim 1, wherein detecting the context change comprises determining that a rule is applicable to a current context that exists at the computing device.

12. The method of claim 1, wherein detecting the context change comprises determining whether a user is present at the computing device.

13. The method of claim 1, wherein detecting the context change comprises receiving notification of one or more events.

14. One or more computer storage media storing computer executable instructions which when executed implement a method for providing privacy controls for one or more audio visual (AV) devices that are available on a computing device, the method comprising:

in response to an AV app opening a first AV device that is available on the computing device, receiving, at a privacy service and from a first filter driver, a handle by which the AV app opened the first AV device;

storing, by the privacy service, the handle;

determining, by the privacy service, that a stream of the first AV device should be blocked;

sending, by the privacy service, a notification to a second filter driver to block the stream of the first AV device, the notification including the handle; and using, by the second filter driver, the handle to prevent the AV app from reading the stream of the first AV device.

15. The computer storage media of claim 14, wherein the second filter driver uses the handle to prevent the AV app from reading the stream of the first AV device by using the handle to identify read requests targeting the first AV device and completing the read requests.

16. The computer storage media of claim 15, wherein completing the read requests comprises filling a buffer with a static image.

17. The computer storage media of claim 16, wherein the static image includes a textual instruction.

18. The computer storage media of claim 14, wherein the method further comprises:

in response to detecting the context change, causing, by the privacy service, a shutter of the first AV device to be closed.

19. A computing device comprising:

one or more processors; and computer storage media storing computer executable instructions which when executed by the one or more processors implement a method for providing privacy controls for one or more audio visual (AV) devices that are available on the computing device, the method comprising:

loading a first filter driver to detect when AV apps attempt to open AV devices that are available on the computing device;

loading a second filter driver to detect when the AV apps generate requests to read streams that the AV devices provide; and loading a privacy service to interface with the first filter driver and the second filter driver, the privacy service being configured to instruct the second filter driver to prevent the AV apps from reading the streams of the AV devices based on context.

20. The computing device of claim 19, wherein the privacy service instructs the second filter driver to prevent the AV apps from reading the streams of the AV devices using identifiers received from the first filter driver.

* * * * *